United States Patent [19]

Ingard et al.

[11] 4,287,962
[45] Sep. 8, 1981

[54] PACKLESS SILENCER

[75] Inventors: Uno Ingard, Kittery Point, Me.; James A. Morgan, Wyckoff, N.J.; Martin Hirschorn, New York, N.Y.

[73] Assignee: Industrial Acoustics Company, Bronx, N.Y.

[21] Appl. No.: 30,925

[22] Filed: Apr. 17, 1979

Related U.S. Application Data

[63] Continuation-in-part of Ser. No. 851,300, Nov. 14, 1977, abandoned.

[51] Int. Cl.³ .................... F01N 1/08; E04F 17/04
[52] U.S. Cl. .................................. 181/224; 181/268; 181/276
[58] Field of Search ............... 181/203, 222, 224, 247, 181/250, 264, 265, 266, 268, 269–273, 281, 225, 226, 277, 214, 229, 276

[56] References Cited

U.S. PATENT DOCUMENTS

| | | |
|---|---|---|
| 2,043,030 | 6/1936 | Bourne . |
| 2,100,655 | 11/1937 | Bourne . |
| 2,252,256 | 8/1941 | Harris ................................. 181/247 |
| 2,265,342 | 12/1941 | Bourne . |
| 2,367,473 | 1/1945 | Smith . |
| 2,575,233 | 11/1951 | Plasse ................................. 181/281 |
| 2,759,556 | 8/1956 | Baruch ............................... 181/203 |
| 2,916,101 | 12/1959 | Naman .............................. 181/224 |
| 3,018,840 | 1/1962 | Bourne et al. ..................... 181/224 |
| 3,033,307 | 5/1962 | Sanders et al. .................... 181/224 |
| 3,120,877 | 2/1964 | Morris et al. |
| 3,195,679 | 7/1965 | Duda et al. ........................ 181/222 |
| 3,477,231 | 11/1969 | Paulson . |
| 3,481,427 | 12/1969 | Dobbs et al. |
| 3,502,171 | 3/1970 | Cowan . |
| 3,503,465 | 3/1970 | Kobayashi et al. |
| 3,511,336 | 5/1970 | Rink et al. ......................... 181/224 |
| 3,527,318 | 9/1970 | Duthion et al. |
| 3,568,791 | 5/1971 | Luxton .............................. 181/224 |
| 3,618,700 | 11/1971 | Bond et al. |
| 3,642,093 | 2/1972 | Schach . |
| 3,650,348 | 3/1972 | Colebrook et al. |
| 3,692,141 | 9/1972 | Labussiere et al. |
| 3,721,389 | 3/1973 | MacKinnon et al. |
| 3,823,796 | 7/1974 | Damiron . |
| 3,854,548 | 12/1974 | Suzuki . |

OTHER PUBLICATIONS

U. Ingard and D. Pridmore-Brown, "Propagation of Sound in a Duct with Constrictions", JASA, vol. 23, No. 6, pp. 689–694, Nov. 1951.

U. Ingard, "On the Theory and Design of Acoustic Resonators", JASA, vol. 25, No. 6, pp. 1037–1061, Nov. 1953.

U. Ingard and R. H. Lyon, "The Impedance of a Resistance Loaded Helmholtz Resonator", JASA, vol. 25, No. 5, pp. 854–857, Sep. 1953.

U. Ingard, "Perforated Facing and Sound Absorption", JASA, vol. 26, No. 2, pp. 151–154, Mar. 1954.

U. Ingard and S. Labate, "Acoustic Circulation Effects and the Non-Linear Impedance of Orifices", JASA, vol. 22, No. 2, pp. 211–218, Mar. 1950.

U. Ingard and R. H. Bolt, "A Free Field Method of Measuring the Absorption Coefficient of Acoustic Materials", JASA, vol. 23, No. 5, pp. 509–516, Sep. 1951.

U. Ingard and R. H. Bolt, "Absorption Characteristics of Acoustic Material with Perforated Facings", JASA, vol. 23, No. 5, pp. 533–540, Sep. 1951.

U. Ingard and D. Pridmore-Brown, "The Effect of Partitions in the Absorptive Lining of Sound-Attenuating Ducts", JASA, vol. 23, No. 5, pp. 589–590, Sep. 1951.

Primary Examiner—L. T. Hix
Assistant Examiner—Benjamin R. Fuller
Attorney, Agent, or Firm—Morgan, Finnegan, Pine, Foley & Lee

[57] ABSTRACT

The construction described is a resistive sheet type of duct liner or duct silencer; i.e., a liner or silencer in which acoustical flow resistance is concentrated in a thin face sheet separating the flow passage and acoustical cavity rather than in an acoustically absorptive packing material filling the acoustical cavity. The invention disclosed is means for applying inexpensive perforated facings, similar to those in a conventional packed silencer, to provide resistive sheets which are effective in terms of noise dissipation and in terms of self-noise (noise generated by flow through the flow passages).

22 Claims, 17 Drawing Figures

Н,962

PACKLESS SILENCER

CROSS-REFERENCE TO RELATED APPLICATION

This application is a continuation-in-part application of our application Ser. No. 851,300 filed Nov. 14, 1977 now abandoned.

FIELD OF INVENTION

The present invention relates to the acoustical gas flow silencer field, e.g. heating, ventilating and air-conditioning systems, engine intakes and exhausts, process blowers and compressors, etc.

BACKGROUND

Conventional silencers of the type in which the silencer is inserted into the flow of gas to attenuate noise traveling in the gas stream have generally relied upon viscous friction in the pores of a cavity filler material.

A conventional silencer typically includes a duct member within which is positioned one or more silencer elements consisting of a perforated facing plate behind which is positioned a filler material, such as foam, rockwool, fiberglass or other fibrous acoustically absorptive bulk material. The filler may be referred to as packing.

Because these packed duct silencers rely on absorption by the packing, the perforated facing sheet is designed to provide optimum sound access from the flow passage to the packing material. Face sheet open face area in these silencers are typically 20% and more.

The use of packing to absorb acoustical noise introduces problems in many applications. The packing tends to erode under high velocity conditions; the packing may absorb toxic or flammable substances or microorganisms; the packing is subject to attack by chemicals; and in the event of fire, some otherwise desirable packings may provide fuel or produce toxic gases.

It has been known for nearly thirty years that, by using face sheets with suitable acoustic flow resistance in lieu of conventional perforated face sheets, broad band acoustical absorption could be obtained without the use of packing.

In order to overcome packing problems, silencers have been designed in which the required acoustic resistance was provided by thin resistive sheets rather than by packing. The resistive sheets of these constructions have been structurally self-supporting sintered materials of laminates of fabrics (metals, glass or synthetic), felts (metals, synthetic or organic) or sintered materials (metal or ceramics)-typically supported on a structural perforated sheet. These silencers have found very limited use due to their high cost.

SUMMARY OF THE INVENTION

The present invention overcomes the shortcomings of the prior art by making use of a commercially available perforated face sheet having an open area in the range of 2 to 10% to provide suitable acoustic flow resistance which is enhanced by the flow present in the silencer passages as a normal consequence of its use.

By proper choice of perforation geometry in a thin sheet of stainless, cold rolled, galvanized steel, aluminum or other metallic or synthetic material, broad band noise dissipation of a useful magnitude can be obtained without the use of packing and without generating unacceptable levels of self-noise.

DETAILED DESCRIPTION OF A PREFERRED EMBODIMENT

Figure 2:
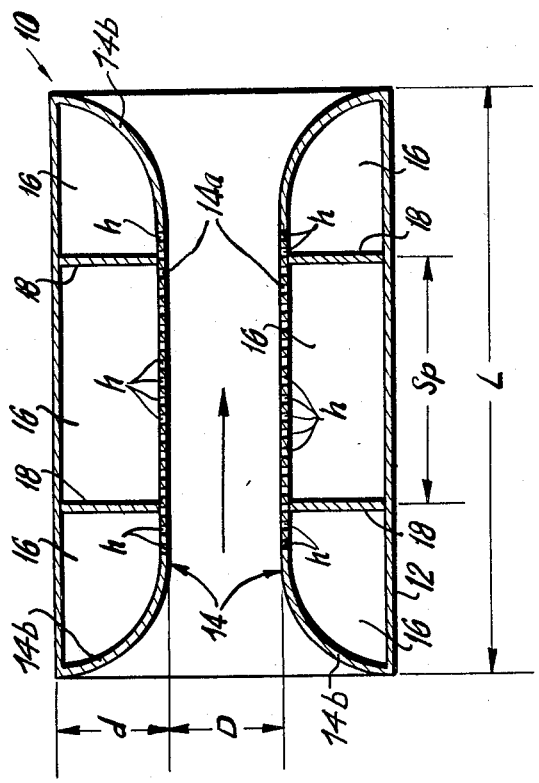
FIG. 2 is a cross-sectional view taken along line 2—2 in FIG. 1.

While this invention is susceptible of embodiment in many different forms, there is shown in the drawings and will hereinafter be described in detail a preferred embodiment of the invention, and modifications thereto, with the understanding that the present disclosure is to be considered as an exemplification of the principles of the invention and is not intended to limit the invention to the embodiments illustrated.

Figure 1:
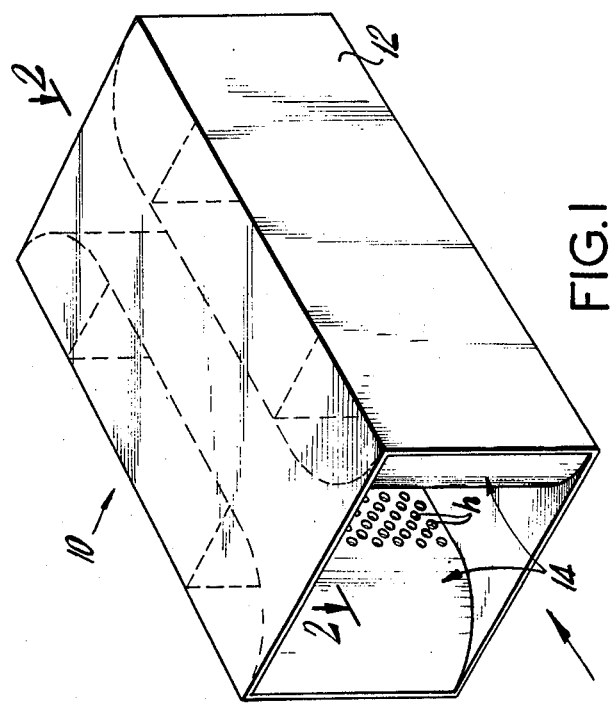
FIG. 1 is a perspective view illustrating a packless acoustic silencer of the present invention.

FIGS. 1 and 2 show a packless acoustic silencer 10 which includes a four sided duct member 12. Within the duct is positioned a pair of opposed facing panels 14 having a generally flattened semi-elliptical shape. The opposing flat portions 14a of each panel are perforated to provide a plurality of holes h which open to chambers (or cavities) 16 formed behind each panel and separated by acoustically opaque and fluid impervious dividers or partition walls 18 and curved end portions 14b of each facing panel are non-perforated, i.e. acoustically opaque.

Silencer 10 is adapted to be placed in a duct system, e.g. heat, ventilating and air conditioning duct. The gas flow, e.g. air, is in the direction indicated by the arrow although gas flow may also be reversed. Duct member 12 may be made of galvanized sheet metal or other materials.

Facing panel 14 is made from galvanized or stainless steel or other metallic or non-metallic, structurally stable material. Advantageously, the perforations have a hole diameter as small as is economically available from a conventional perforation punching process. A diameter of 0.032 or 0.046 inch is suitable for 26 gauge material, applicable to an air conditioning silencer; and 0.125 is suitable for 11 gauge steel which might be used in a gas turbine silencer. Advantageously, the spacing of the perforations h is such that an open area ratio of less than 20%, preferably in the range of 2 to 10% is achieved along the face panels. The thickness of the face panel may be in the range of 26 gauge to 11 gauge (0.018 to 0.12 inch). Lighter gauges of corrosion resistant material might be used if provision is made for structural support and stiffening. Heavier gauge might be used in some special applications, but probably with a loss of sound dissipation efficiency.

The perforated panel or sheet 14 is characterized by its hole diameter $d_h$, hole separation $S_h$ and sheet thickness t. The acoustical (dynamic) impedance of the sheet $Z_s$, consists of a resistive part $R_s$ and a reactive (mass reactive) part $X_s$. The acoustical impedance of the air cavity 16 behind the sheet depends upon the depth d and the spacing between partitions $S_p$. The impedance of the cavities 16 is mainly reactive, representing a stiffness at low frequencies with a corresponding reactance $X_c$. The attenuation of the silencer may be expressed in terms of an impedance Z which is the sum of the sheet impedance $Z_s$ and the cavity reactance.

The total resistance is equal to the sheet resistance $R_s$ and the total reactance X is the sum of the sheet and cavity reactance, $X = X_s + X_c$.

Attenuation is a complex function of $R_s$ and X. As a design guide, it has been found that optimization of the attenuation is approximately equivalent to maximization of the following quantity:

$$\frac{R_s}{R_s^2 + (X_s + X_c)^2}$$

Thus, $R_s$ cannot be too small or too large and $(X_s + X_c)$ cannot be too large.

Optimization of the resistive factor for silencers suited to the applications previously noted is obtained with an acoustic flow resistance, $R_s$, in the range of 1 to 4 $\rho c$ where $\rho c$ is the characteristic resistance of gas, e.g. air, —$\rho$ being density and c being the speed of sound for the particular application. This resistance in prior art silencers has been provided by the viscous friction in the pores of resistive sheet materials.

In the present invention, however, an optimum flow resistance is produced by interaction of mean flow in the duct with the perforated facing panel. The mechanism, through which mean flow produces an optimum resistance, is related to an acoustically induced deflection or "switching" of some of the mean flow in and out of the perforations. This switching requires energy which is taken from the sound field. This effect, first observed by C. E. McAuliffe in 1950, *Study of Effect of Grazing Flow on Acoustical Characteristics of an Aperture*, M.S. Thesis, Department of Naval Architecture, M.I.T., can be expressed as an equivalent acoustic resistance of the sheet.

In addition, the total attenuation depends on the width D of the silencer flow passage and the length L.

In utilizing a perforated sheet chosen to provide (in conjunction with mean flow) the desired properties for dissipation of sound, a serious problem arises which, until the present invention, prevented the use of perforated sheets to form a packless silencer. The problem, initially referred to as "whistle", has to do with the self-noise which was produced by interaction of flow with the sound and with the perforations in the sheet.

The self-noise produced by a silencer depends on the flow speed and on the geometrical parameters of the perforated sheet.

Theoretical analysis has provided some guidelines for optimization of attenuation. However, there is at present no reliable theoretical analysis from which the level of self-noise can be predicted, and applicants have had to rely on experimental studies to establish self-noise characteristics.

A combined theoretical and experimental investigation, involving tests of over a hundred configurations, has led applicants to a range of design parameters which yield the maximum possible attenuation with self-noise acceptable even in critical HVAC applications which do not complicate, or significantly increase cost of, the perforated resistive sheet.

Experimental investigation confirmed that optimum properties of sound dissipation are obtained with perforated open areas in the range of 2.5 to 10%. A correlation of self-noise level with mean flow velocity and percent open area, and a correlation of peak self-noise frequency with mean flow velocity and the perforation geometry have been found. Discovery of a correlation of self-noise level with perforation geometry permits the reduction in self-noise of as much as 30 decibels by choices of perforation geometry that still fall within the range of economically producible and commercially available perforated metal sheets.

Figure 8:
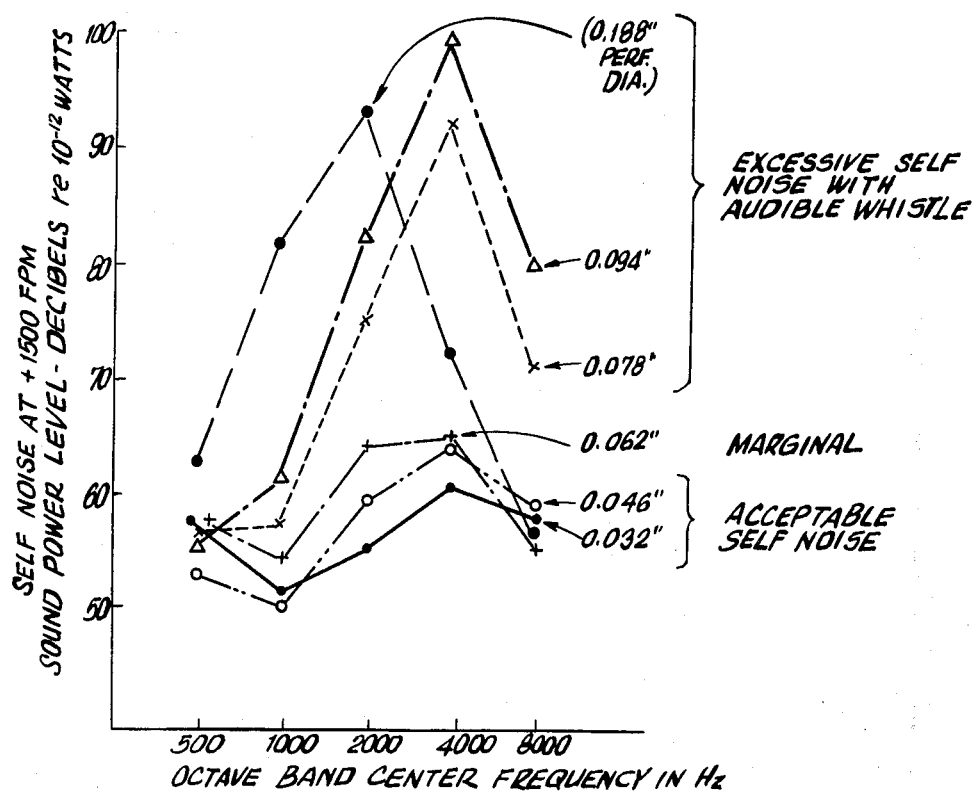
FIGS. 8–11 are graphs of various silencer performance correlations as function of octave band frequency.

The appended graphs, FIGS. 8-11, illustrate some of the significant correlations that applicants have obtained. FIG. 8 shows self-noise for packless silencers with various face sheet perforation diameters but otherwise of identical configuration and construction and at the same mean flow velocity. The perforated face sheet in each was 26 gauge with 2½% open area. The perforation diameters were 0.032, 0.046, 0.062, 0.078, 0.094, 0.125 and 0.188. The air flow speed is 1500 feet per minute (FPM).

Figure 9:
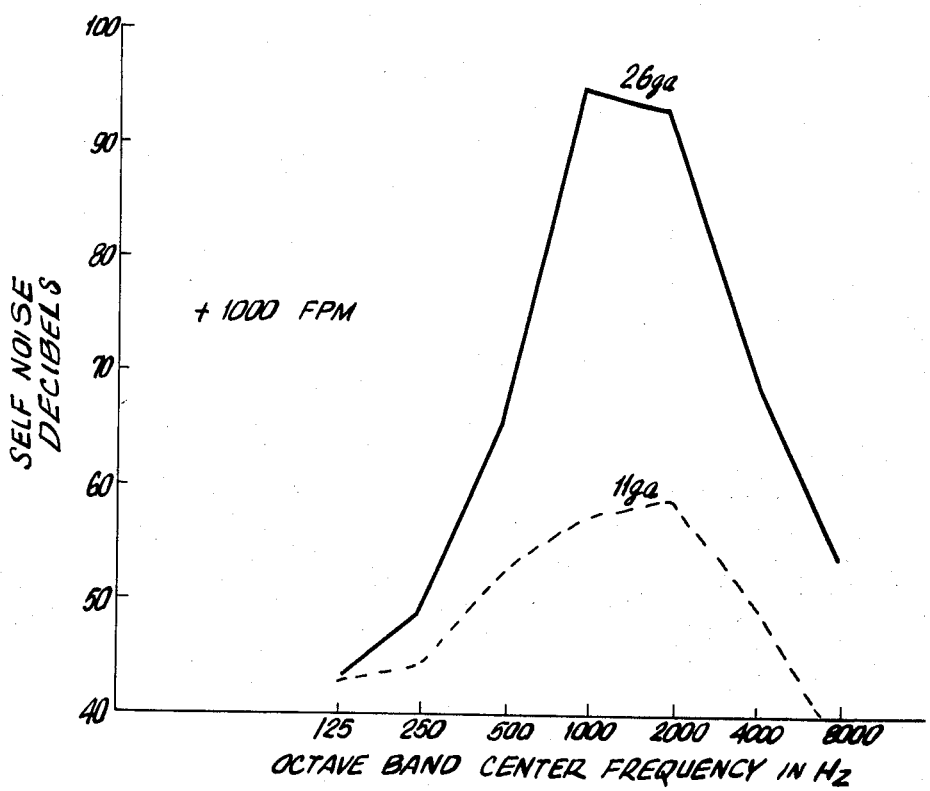

FIG. 9 shows self-noise under similar conditions as described above except that the two silencers compared have perforations of the same diameter (0.125 inch) but have different perforation geometries in that thickness of the perforated sheets is different (26 gauge and 11 gauge) with flow at 1000 FPM.

Figure 10:
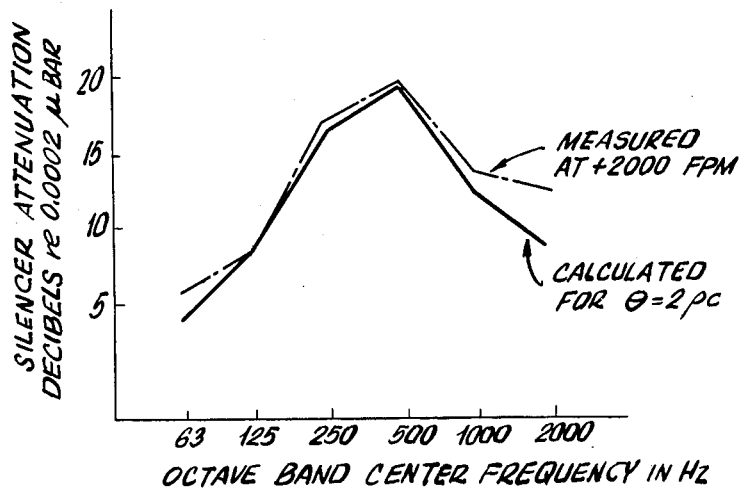

FIG. 10 shows calculated packless silencer attenuation for an effective face sheet flow resistance of 2 $\rho c$ versus actual performance of a silencer constructed according to this invention.

Figure 11:
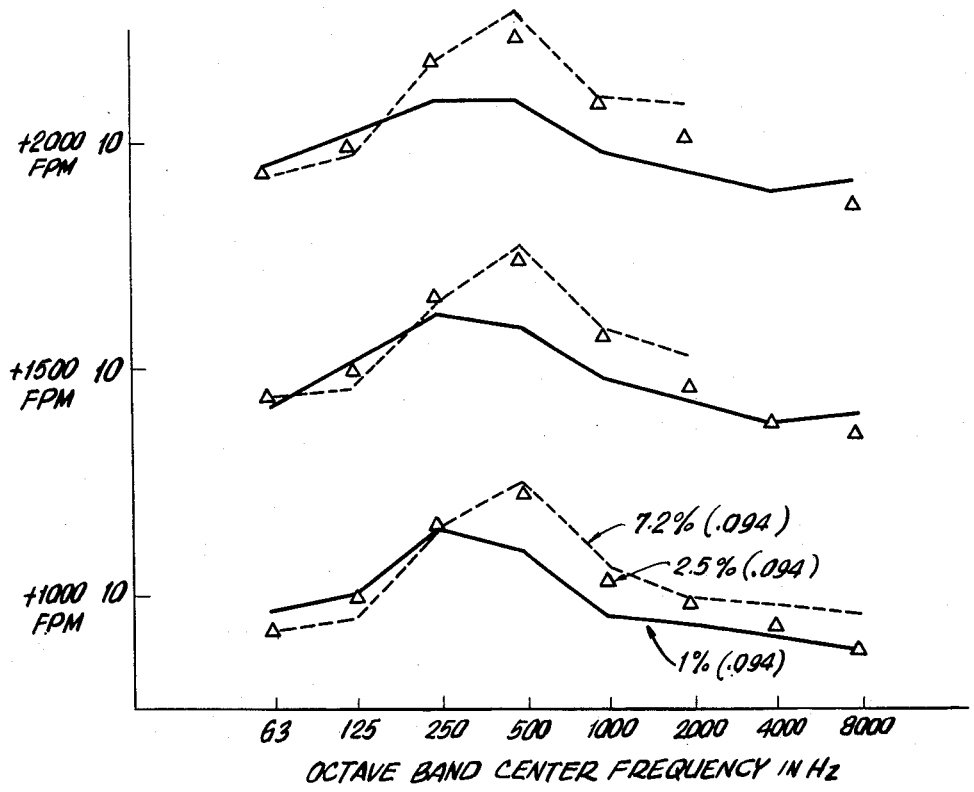

FIG. 11 shows attenuation of three silencers constructed according to this invention with 1, 2.5 and 7.2% perforated face open areas. This graph illustrates loss of performance with open area less than 2%.

The silencer 10 as previously discussed replaces a length of duct work in a gas passage. Although the face panels 14 are illustrated as being on opposite sides of the flow chamber, the entire flow passage may be faced with perforated face panels of the type described, e.g. rectangular or cylindrical duct with a packless duct liner.

In some applications, it may be desirable, depending upon allowable flow restriction and acoustical requirements, to arrange several silencers in series. Some of these arrangements are illustrated in FIGS. 3-7.

wherein corresponding numerical designations indicate corresponding elements.

Figure 3:
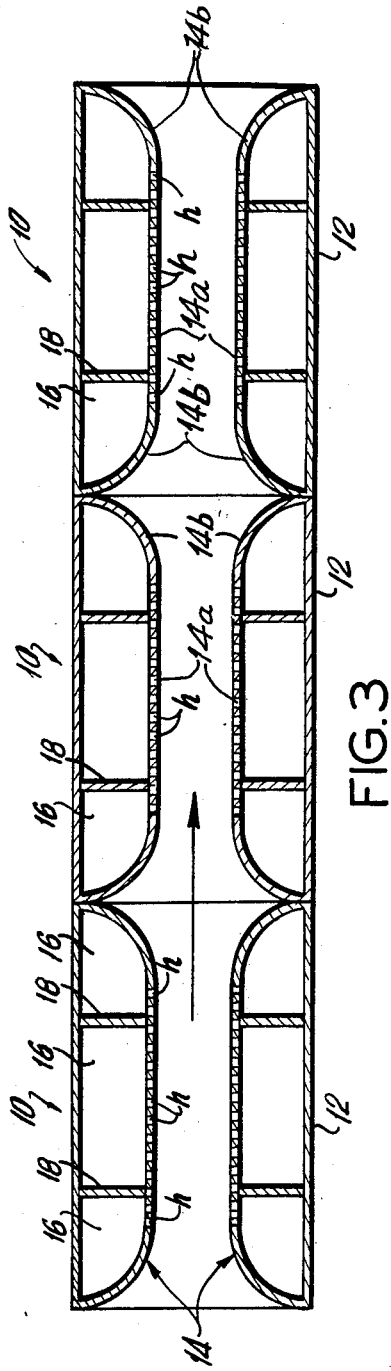
FIG. 3 is a cross-sectional view illustrating a series arrangement of silencers in accordance with the present invention.

FIG. 3 illustrates a tandem arrangement of three silencers 10 which provide a convenient means of extending the effective length of the silencer through the use of standard silencer modules.

Figure 4:
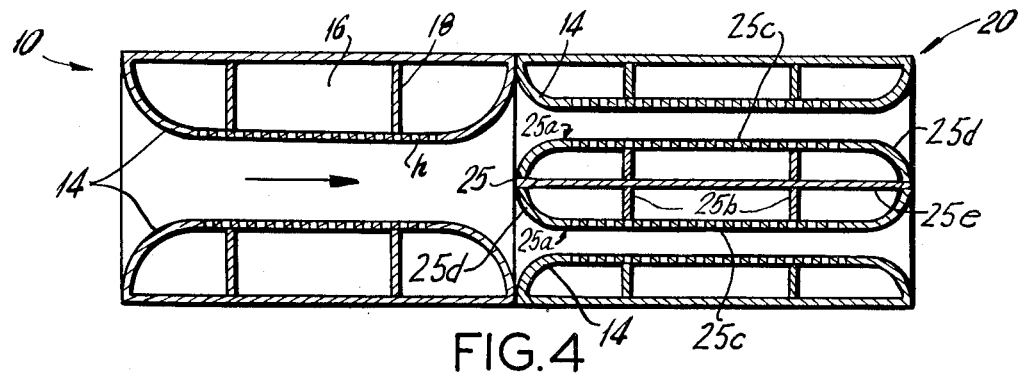
FIG. 4 is a cross-sectional view of a silencer of FIG. 1 joined with a silencer of the same type, but with cavity depth chosen to enhance performance at a higher frequency.

FIG. 4 illustrates a combined silencer which includes a first silencer 10 and a second silencer 20 in tandem. Silencer 20 is similar in structure to silencer 10 except that its flow passage includes a splitter element 25. Splitter 26 is generally of a flattened elliptical shape and provides perforated facing panels 25a adjacent the gas flow passages. As illustrated each facing panel 25a includes a perforated, substantially flat center portion 25c, a pair of curved, non-perforated, i.e. acoustically opaque end portions 25d, and an acoustically opaque central longitudinal septum member 25e extending from the trailing end of the splitter to the opposite end thereof, septum 25e connecting the adjacent curved splitter end portions at each end of the splitter. The splitter 25 also includes spaced apart acoustically opaque and fluid impervious transverse cavity dividers or partitions 25b. The procedure for selecting the hole size and open area of the face sheets is as previously described. Cavity depth and flow passage width are chosen to optimize attenuation at a higher frequency for silencer 20 than for silencer 10. This combination provides better dynamic insertion loss (DIL) in some octave bands than does a combination of two silencers of configuration 10 so that design flexibility may be increased if acoustic noise in these octave bands are critical in the application.

Figure 5:
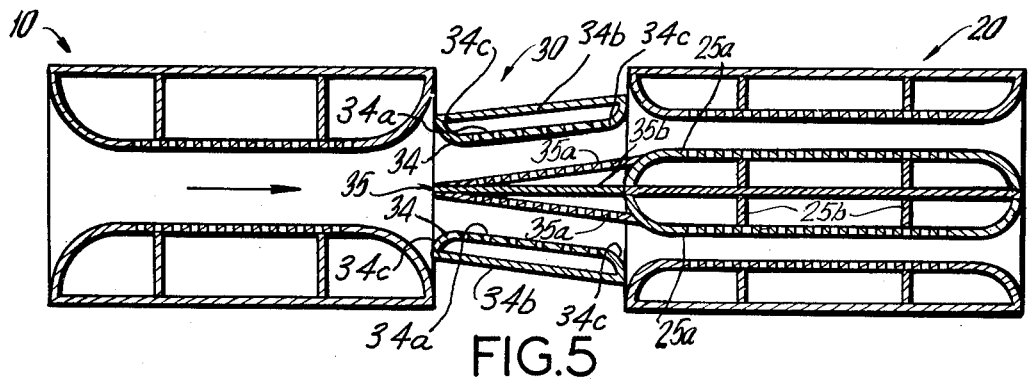
FIG. 5 is a cross-sectional view of two silencers of FIG. 4 joined by a transition member designed to reduce restriction to air flow while further supplementing high frequency performance.

FIG. 5 illustrates a silencer combination of silencers 10 and 20 joined by a transition member 30. Member 30 provides a tapered transition from silencer 10 to silencer 20 and includes perforated face panels 34 and a centrally disposed generally triangular shaped splitter 35 having perforated facing panels 35a adjacent the flow paths and a central longitudinal partition wall 35b. As illustrated, transition member face panel 34 is of substantially flattened elliptical configuration having a perforated inner sidewall 34a a non-perforated, i.e. fluid impervious and acoustically opaque outer sidewall 34b and a pair of fluid impervious, acoustically opaque end walls 34c which connect the inner and outer sidewalls of each transitions member facing panel to one another thus defining a cavity within each transition member face panel. The transition member 30 is useful in improving DIL in the higher frequencies and in reducing flow restriction.

Figure 6:
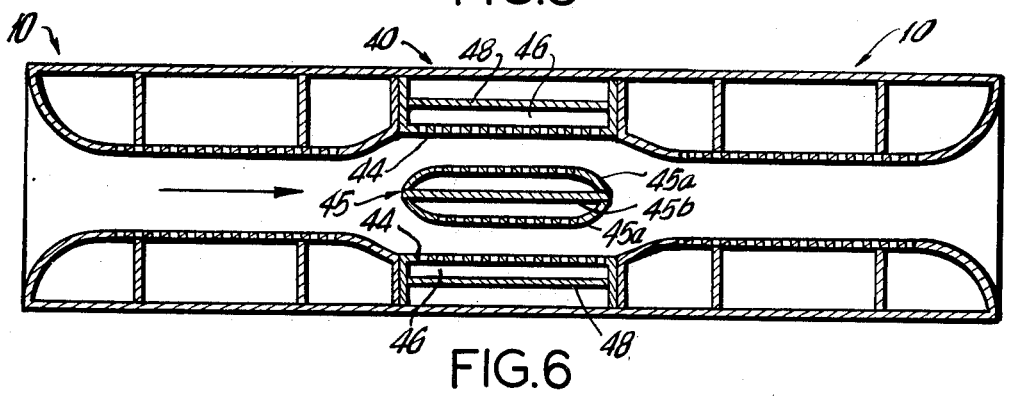
FIG. 6 is a cross-sectional view of two silencers of FIG. 1 joined by a transition member with a splitter.

FIG. 6 illustrates a pair of silencers 10 joined by a high frequency transition member 40. This arrangement, similar to that shown in FIG. 5, supplements DIL of similar silencers in tandem. Transition member 40 includes lateral perforated facing panels 44 which define a cavity 46 with longitudinally disposed partitions 48. A central splitter 45 of flattened elliptical shape includes perforated facing panels 45a and a longitudinal partition wall 45b.

Figure 7:
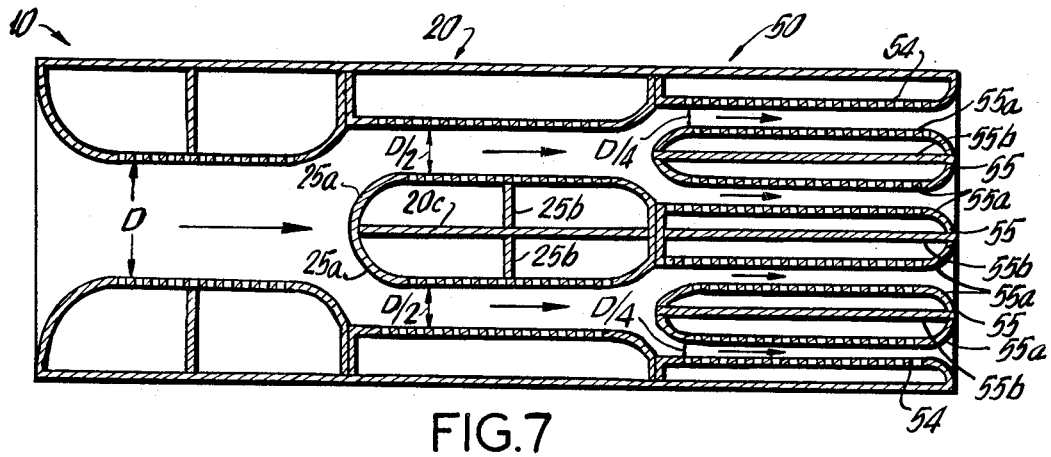
FIG. 7 is a cross-sectional view of a triple tuned silencer in which each of three modules provides broad band performance but each of which is tuned for peak performance at a different frequency.

FIG. 7 illustrates a triple tuned silencer arrangement wherein the flow passage width is progressively reduced by a factor of ½ through three silencers, as indicated in the figure. This arrangement has application in situations where even broader range DIL is desired. The arrangement includes a silencer 10 having a flow passage width of D joined to a single splitter silencer 20 having two flow passages each D/2 in width.

Finally, silencer 50 includes three splitters 55 which further divide the flow passages to a width of D/4. Each splitter 50 includes a pair of perforated facing panels 55a and central longitudinally disposed partition wall 55b. The duct wall also includes perforated facing panels 54.

The splitter 35 shown in FIG. 5 has, of course, a varying-depth-cavity which is acoustically active. The significance of the varying cavity depth is that it broadens the insertion loss characteristics of the silencer, i.e. decreases peak IL and increases IL at other frequencies in a given size silencer.

Figure 12:
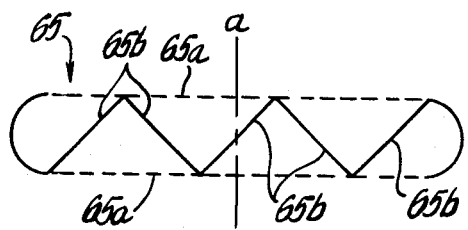
FIGS. 12 and 13 are schematic cross-sectional views of splitters with varying depth partition walls.
Figure 13:
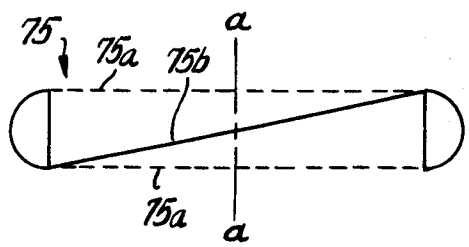

Other configurations in addition to triangular shaped splitter 35 are possible. FIGS. 12 and 13 show two alternative embodiments for splitters 65 and 75. Each splitter has perforated facing panels 65a, 75a which form a flattened elliptical shape, much the same as splitter 25. The varying-depth-cavity configuration is provided by fabricating the partition walls 65b, 75b to produce the varying depth. In splitter 65, partition wall 65b is a zig-zag shape so that cavity depth along the silencer goes through a sequence of enlarging and contracting. The splitter 75 has a longitudinal partition 75b which varies uniformly along the length of the splitter, i.e. the cavity undergoes a single cycle change similar to splitter 35 but with parallel perforated facing panels 75a.

The varying depth cavity may also be embodied in the primary facing panel configuration to achieve both the broadening of the IL and to change the stream flow direction to eliminate "line-of-sight" through the silencer.

Figure 14:
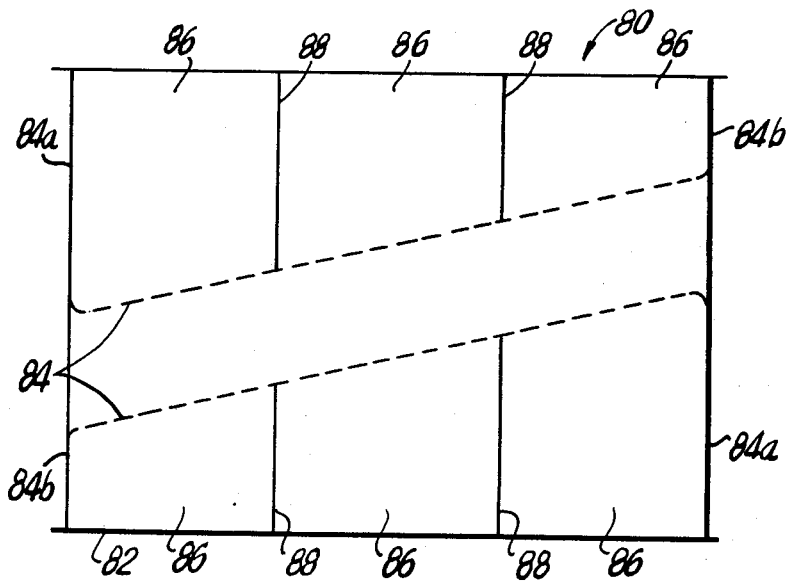
FIG. 14 is a schematic cross-sectional view of a silencer taken generally along line 14—14 of FIG. 15 with a varying depth cavity.
Figure 15:
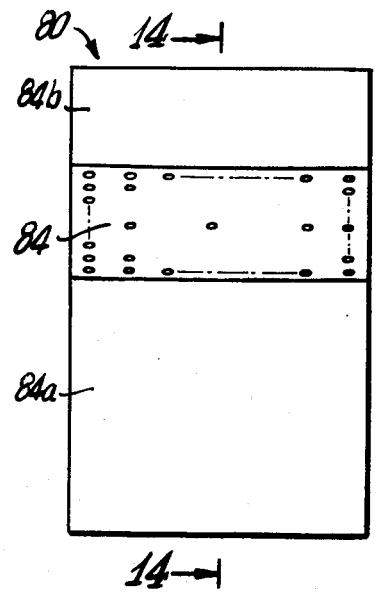
FIG. 15 is a right end view of the silencer of FIG. 14.

FIGS. 14 and 15 show a packless silencer 80 which includes a four side duct member 82 within which is positioned a pair of opposed facing panels 84. The panels are perforated as described above and are tapered in opposed fashion so that each panel has a long end 84a and a short end 84b at opposite ends. This arrangement produces a flow channel which is angled with respect to the longitudinal axis. The perforated facing panels 84 are supported by lateral partition walls 88 to form a plurality of different depth cavities 86 along the length of the silencer 80. The angle of the partition walls 84 is such that when viewed from the end, see FIG. 15, the line-of-sight is blocked by a perforated facing panel 84.

Figure 16:
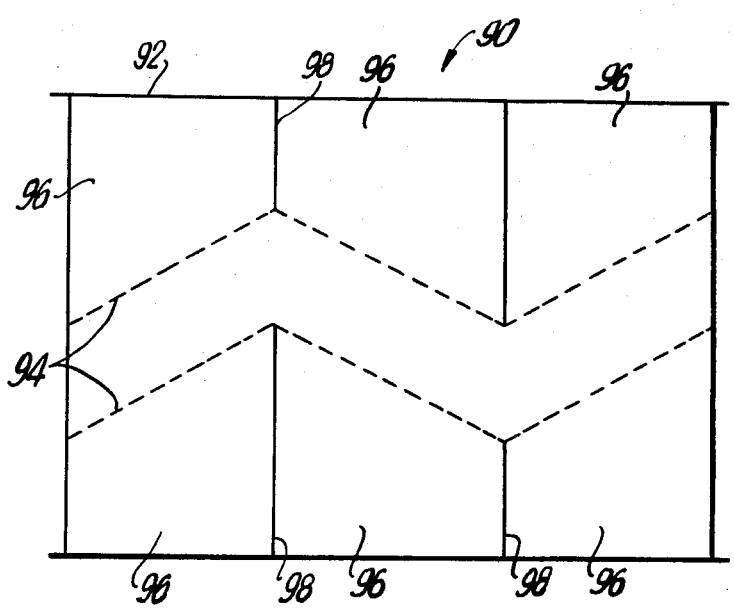
FIG. 16 is a schematic cross-sectional view of a silencer with a zig-zag varying depth cavity.

Still another silencer 90 is shown in FIG. 16 wherein both varying-depth-cavity and elimination of line-of-sight is achieved. Silencer 90 includes a pair of zig-zag configured, perforated panels 94 which together with partition walls 98 form a plurality of varying-depth-cavities 96 along the length of the silencer. Additionally, the zig-zag configuration blocks the line-of-sight through the silencer.

Figure 17:
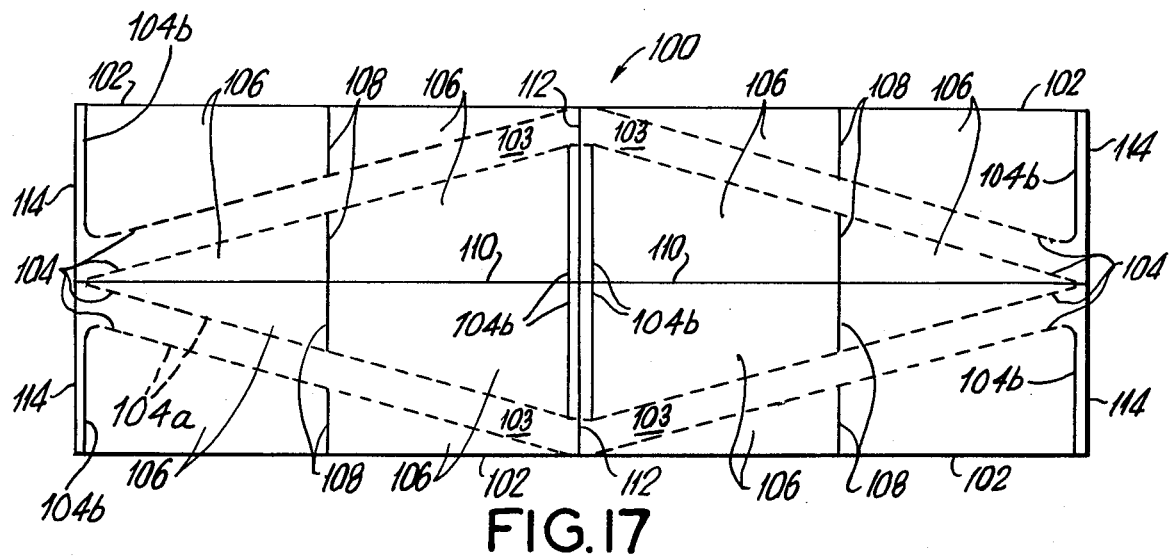
FIG. 17 is a schematic cross-sectional view of a silencer with two symmetrical diverging-converging air flow paths.

FIG. 17 shows still another silencer 100 in accordance with this invention. Silencer 100 includes two symmetrical air flow paths 103 formed by juxtaposed perforated panels 104. Panels 104 which include inner wall portions 104a and end wall portions 104b and partition walls 108, together with silencer housing 102 or longitudinal partition wall 110, form a plurality of varying depth cavities 106. Additionally, the line-of-sight through the silencer is blocked by the divergent-convergent flow path configuration formed by perforated panels 104. Any quarter section of this symmetrical silencer, defined by housing 102, transverse seam 112, partition wall 110 and end edge 114, may be interchanged with any other quarter section, and each quarter section can function independently.

From the above description, it will be readily apparent to those skilled in the art that other modifications may be made to the present invention without departing from the scope and spirit thereof as pointed out in the appended claims.

We claim:

1. A packless acoustic silencer for use in a duct member having a pair of opposed, upstanding sidewall members, for attenuating noice associated with a fluid medium passing through said silencer comprising:

a pair of opposed, spaced apart facing panels each of which being disposed within the duct and adjacent to one of said duct sidewalls, each facing panel including a substantially flat center wall portion spaced apart from its adjacent duct sidewall and a pair of curved end wall portions, each end wall portion being connected to its adjacent duct sidewall to define a cavity within each facing panel, the space between the facing panels defining a fluid passageway bordered by each facing panel center wall portion, said center wall portions being generally parallel to one another and perforated having an open area in the range of from about 2 to 10%, said perforations each having an effective diameter in the range of from about 0.032 inch to 0.125 inch respectively for facing panels having a thickness of from about 26 gauge to 11 gauge, each of the duct sidewalls and facing panel end walls being acoustically opaque and impervious to the fluid such that there is no net flow of the fluid through said facing panels.

2. The silencer of claim 1 which further includes an acoustically opaque, fluid impervious divider member disposed transversely between each facing panel and its adjacent duct sidewall such that each facing panel cavity is divided into chambers, each of which communicating directly with the medium flow but not directly with each other.

3. The silencer of claim 1 which further includes a splitter member disposed between and spaced from said facing panels, said splitter member including a pair of opposed spaced apart substantially flat center wall portions, a pair of end portions, and a central longitudinal septum member disposed between said splitter center wall portions and extending longitudinally from one end of the splitter to the other end thereof thereby defining a splitter cavity between each splitter center wall portion and the splitter septum member, each of said splitter end portions and said splitter septum member being acoustically opaque and impervious to the fluid medium, each of said splitter center wall portions being perforated.

4. The silencer of claim 3 in which the splitter member further includes first and second transverse divider members each of which being spaced apart from one another and extending transversely from one of said splitter center wall portions to the other splitter center wall portion, each of said first and second transverse splitter divider members being acoustically opaque and impervious to the fluid medium and each of the perforated splitter center wall portions having an open area in the range of from about 2 to 10%, said perforations each having an effective diameter in the range of from about 0.032 inch to 0.125 inch respectively for wall portions having a thickness of from about 26 gauge to 11 gauge.

5. The silencer of claim 1 which further includes a closed splitter member disposed between said facing panels, said splitter member including a pair of opposed, spaced apart center wall portions, a pair of end portions connecting together the adjacent ends of each respective splitter wall portion, and a partition member extending longitudinally from one splitter end portion to the other splitter end portion, said partition member having a zig-zag configuration so as to define a plurality of splitter cavities, the splitter cavity depths along the length of the splitter going through a sequence of enlarging and contracting, each of said splitter end portions and said splitter partition member being acoustically opaque and impervious to the fluid medium, each of said splitter center wall portions being perforated and having an open area in the range of from about 2 to 10%, said perforations each having an effective diameter in the range of from about 0.032 inch to 0.125 inch respectively for wall portions having a thickness of from about 26 gauge to 11 gauge.

6. The silencer of claim 1 which further includes a closed splitter member disposed between said facing panels, said splitter member including a pair of opposed spaced apart center wall portions, a pair of end portions connecting together the adjacent ends of each respective splitter center wall portion, and a partition member disposed between said splitter wall portions and extending substantially diagonally across the splitter from one end of one splitter center wall portion to the other end of the other splitter center wall portion so as to define a splitter cavity between each splitter center wall portion and said partition member, one splitter cavity decreasing in depth from one end of the splitter to the opposite end thereof, the other splitter cavity increasing in depth from said one end of the splitter to said opposite end thereof, each of said splitter center wall portions being perforated having an open area in the range of from about 2 to 10%, said perforations each having an effective diameter in the range of from about 0.032 inch to 0.125 inch respectively for wall portions having a thickness of from about 26 gauge to 11 gauge, said partition member and said splitter end portions being acoustically opaque and impervious to the fluid medium.

7. The silencer of claim 6 which further includes second and third acoustically opaque partition members disposed transversely between each end of said first partition member and its opposed splitter center wall portion.

8. A packless acoustic silencer for use in a duct member having a pair of opposed, upstanding sidewall members, a base portion and a roof portion for attenuating noise associated with a fluid medium passing therethrough comprising:

a pair of opposed spaced apart facing panels, each of which being disposed within the duct and adjacent to one of said duct sidewalls, each facing panel including a substantially flat center wall portion and a pair of end wall portions, each end wall portion connecting its associated center wall portion to the duct sidewall adjacent thereto to define a cavity within each facing panel, the space between the facing panels defining a fluid passageway bordered by each center wall portion, said center wall portions being perforated having an open area in the range of from about 2 to 10% said perforations each having an effective diameter in the range of from about 0.032 inch to 0.125 inch respectively for facing panels having a thickness of from about 26 gauge to 11 gauge, each of the duct sidewalls and the end walls being acoustically opaque and impervious to the fluid such that there is no net flow of fluid through said facing panels, each of said facing panels tapering in width along the length of the silencer in the opposite direction from the other facing panel such that one of said facing panel cavities decreases in depth from one end of the silencer to the opposite end thereof while the other facing panel cavity increases in depth from said one end of the silencer to said opposite end thereof, said fluid passageway being angled with respect to the longitudinal axis of the silencer.

9. The silencer of claim 8 which further includes a pair of spaced apart and aligned acoustically opaque and fluid impervious partition members, each being transversely, disposed between one of said duct sidewalls and its adjacent facing panel center wall portion to divide each facing panel cavity into a plurality of chambers each of which communicating directly with the fluid medium but not with its adjacent chamber.

10. A packless acoustic silencer for use in a duct member having a pair of opposed upstanding sidewall members for attenuating noise associated with a fluid medium passing through said silencer comprising:
a pair of spaced apart facing panels, each of which being disposed within the duct adjacent to one of said duct sidewalls and including a center wall portion spaced apart from its adjacent duct sidewall and a pair of curved end wall portions each end wall portion connecting its associated center wall portion to the duct sidewall adjacent thereto to define a cavity within each facing panel, each center wall portion being perforated, having an open area in the range of from about 2 to 10%, said perforations each having an effective diameter in the range of from about 0.032 inch to 0.125 inch respectively for facing panels having a thickness of from about 26 gauge to 11 gauge, each of the duct sidewalls and the end walls being acoustically opaque and impervious to the fluid, each of said center wall portions having a zig-zag configuration complementary to the other center wall portion thus defining a zig-zag fluid passageway having peaks and troughs through the silencer such that each of said cavities goes through a sequence of enlarging and contracting.

11. The silencer of claim 10 which further includes a plurality of acoustically opaque, fluid impervious partition members, each of said partition members being disposed transversely between each duct sidewall and its associated facing panel center wall portion to divide each facing panel cavity into a plurality of chambers each of which communicates directly with the fluid but not with its adjacent chamber.

12. A packless acoustic silencer for use in a duct member having a pair of opposed upstanding sidewall members for attenuating noise associated with a fluid medium passing through said silencer comprising:
first and second pairs of opposed spaced apart facing panels, each facing panel being disposed within the duct adjacent to one of said duct sidewalls and including a center wall portion spaced apart from its adjacent duct sidewall and a pair of end wall portions each of said end wall portions connecting its associated facing panel to the duct sidewall adjacent thereto to define a cavity within each facing panel, each facing panel center wall portion being perforated having an open area in the range of from about 2 to 10%, said perforations each having an effective diameter in the range of from about 0.032 inch to 0.125 inch respectively for facing panels having a thickness of from about 26 gauge to 11 gauge, each of the duct sidewalls and facing panel end walls being acoustically opaque and impervious to the fluid; and a splitter member disposed between and spaced apart from said second pair of facing panels, said splitter member including a pair of spaced apart substantially flat center wall portions, a pair of end portions, and a central longitudinal septum member disposed between said splitter center wall portions and extending longitudinally from one end of the splitter to the other end thereof thereby defining a splitter cavity between each splitter center wall portion and the splitter septum member, each of said splitter end portions and said splitter septum member being acoustically opaque and impervious to the fluid medium, each of said splitter center wall portions being perforated, there being a fluid passageway between the center wall portions of the first pair of facing panels and between the center wall portions of the second pair of facing panels and the splitter member.

13. The silencer of claim 12 which further comprises:
an acoustically opaque and fluid impervious divider member extending transversely between each duct sidewall and its associated facing panel to divide each facing panel cavity into a plurality of chambers each of which communicates directly with the fluid medium but not directly with its adjacent chamber; and
an acoustically opaque and fluid impervious splitter divider member extending transversely from one perforated splitter center wall portion to the other perforated splitter center wall portion, each of said perforated splitter center wall portions having an open area in the range of from about 2 to 10%, said perforations each having an effective diameter in the range of from about 0.032 inch to 0.125 inch respectively for wall portions having a thickness of from about 26 gauge to 11 gauge.

14. A packless acoustic silencer for use in a duct member having a pair of opposed upstanding sidewall members, for attenuating noise associated with a fluid medium passing through said silencer comprising:
first and second pairs of opposed spaced apart duct facing panels, each duct facing panel being disposed within the duct adjacent to one of said duct sidewalls and including a center wall portion spaced apart from its adjacent duct sidewall and a pair of end wall portions each of said end wall portions connecting its associated duct facing panel to the duct sidewall adjacent thereto to define a cavity within each duct facing panel, each duct facing panel center wall portion being perforated having an open area in the range of from about 2 to 10%, said perforations each having an effective diameter in the range of from about 0.032 inch to 0.125 inch respectively for facing panels having a thickness of from about 26 gauge to 11 gauge, each of the duct sidewalls and duct facing panel end walls being acoustically opaque and impervious to the fluid such that there is no net flow of the fluid through said duct facing panels;
a splitter member disposed between and spaced apart from said second pair of duct facing panels, said splitter member including a pair of spaced apart substantially flat center wall portions, a pair of end portions and a central longitudinal septum member disposed between said splitter center wall portions and extending longitudinally from one end of the splitter to the other end thereof thereby defining a splitter cavity between each splitter center wall portion and the splitter septum member, each of said splitter end portions and said splitter septum member being acoustically opaque and impervious to the fluid medium, each of said splitter center wall portions being perforated, there being a fluid passageway between the center wall portions of the first pair of duct facing panels and between each center wall of the second pair of duct facing panels and the splitter member; and a transition member disposed between said first and second pairs of duct facing panels, said transition member including a pair of spaced apart transition member facing panels which diverge from said first to said second pair of duct facing panels, each of said transition member facing panels being disposed within the duct adjacent to one of said duct sidewalls and having inner and outer side wall portions and a pair of end wall portions connecting the respective inner and outer side wall portions to define a cavity within each transition member facing panel, the inner side wall portions of each transition member facing panel being perforated, the remaining portions of said transition member facing panels being acoustically opaque and fluid impervious, said transition member further including a transition splitter member disposed between and spaced apart from said transition member facing panels to define a pair of fluid passageways within said transition member, each of said transition member fluid passageways being contiguous with the fluid passageway between the first pair of duct facing panels and one of the fluid passageways between said second pair of duct facing panels, said transition splitter member having a pair of spaced apart perforated wall portions which diverge from said first pair of duct facing panels to said second pair of duct facing panels septum member dividing the transition splitter into a pair of cavities each of which communicates directly with the fluid medium but not with each other.

15. The silencer of claim 14 which further comprises:
an acoustically opaque and fluid impervious divider member extending transversely between each duct sidewall and its associated duct facing panel to divide each facing panel cavity in said first and second pair of duct facing panels into a plurality of chambers each of which communicates directly with the fluid medium but not directly with its adjacent chamber; and an acoustically opaque and fluid impervious splitter divider member disposed in the splitter associated with the second pair of duct facing panels and extending transversely from one of said perforated splitter center wall portions to the other perforated splitter center wall portion, each of said perforated splitter center wall portions having an open area in the range of from about 2 to 10%, said perforations each having an effective diameter in the range of from about 0.032 inch to 0.125 inch respectively for wall portions having a thickness of from about 26 gauge to 11 gauge.

16. A packless acoustic silencer for use in a duct member having a pair of opposed, upstanding sidewall members for attenuating noise associated with a fluid medium passing through said silencer comprising:

first and second spaced apart pairs of facing panels, the facing panels in each pair being spaced from one another to define a fluid passageway between each of said first and second pairs of facing panels, each facing panel being disposed within the duct adjacent to one of said duct sidewalls and including a center wall portion spaced apart from its adjacent duct sidewall and a pair of end wall portions each of said end wall portions connecting its associated facing panel to the duct sidewall adjacent thereto to define a cavity within each facing panel, each facing panel center wall portion being perforated having an open area in the range of from about 2 to 10%, said perforations each having an effective diameter in the range of from about 0.032 inch to 0.125 inch respectively for facing panels having a thickness of from about 26 gauge to 11 gauge, each of the duct sidewalls and facing panel end walls being acoustically opaque and fluid impervious; and a transition member disposed between said first and second pairs of facing panels, said transition member including a third pair of spaced apart facing panels, each of said third pair of facing panels being disposed within the duct adjacent to one of said duct sidewalls and having, a center wall portion spaced apart from its adjacent duct sidewall a pair of end wall portions each of said end wall portions connecting its associated transition member facing panel to the duct sidewall adjacent thereto and an acoustically opaque and fluid impervious longitudinal partition member extending between each transition member facing panel end portion to define a pair of cavities within each transition member facing panel, the center wall portions of each transition member facing panel being perforated, the remaining portions of said transition member facing panels being acoustically opaque and fluid impervious, said transition member further including a transition splitter member disposed between and spaced apart from said transition member facing panels to define a fluid passageway between each transition member facing panel and said transition splitter member, said transition splitter member having a pair of spaced apart splitter facing panels, each splitter facing panel having a perforated center wall portion, a pair of acoustically opaque and fluid impervious end wall portions and an acoustically opaque and fluid impervious longitudinal partition member extending from one end of the splitter to the other end thereof thus dividing the transition splitter into a pair of cavities, each of which communicating directly with the fluid medium but not with each other.

17. The silencer of claim 16 which further comprises:
an acoustically opaque and fluid impervious divider member extending transversely between the duct sidewalls of each facing panel of said first and second pairs of facing panels to divide each cavity in said first and second pairs of facing panels into a plurality of chambers each of which communicating directly with the fluid medium but not directly with its adjacent chamber; and wherein each of said perforated center wall portions of said third pair of facing panels and said transition member splitter center wall portions has an open area in the range of from about 2 to 10%, said perforations each having an effective diameter in the range of from about 0.032 inch to 0.125 inch respectively for facing panels having a thickness of from about 26 gauge to 11 gauge.

18. A packless acoustic silencer for use in a duct member having a pair of opposed upstanding sidewall members for attenuating noise associated with a fluid medium passing through said silencer comprising:

first, second and third juxtaposed pairs of spaced apart duct facing panels, each duct facing panel being disposed within the duct adjacent to one of said duct sidewalls and including a center wall portion spaced apart from its adjacent duct sidewall and a pair of end wall portions each of said end wall portions connecting its associated facing panel to the duct sidewall adjacent thereto to define a cavity within each duct facing panel, each duct facing panel center wall portion being perforated having a open area in the range of from about 2 to 10%, said perforations each having an effective diameter in the range of from about 0.032 inch to 0.125 inch respectively for facing panels having a thickness of from about 26 gauge to 11 gauge, each of the duct sidewalls and duct facing panel end walls being acoustically opaque and impervious to the fluid;

an intermediate splitter member disposed between and spaced apart from said second pair of duct facing panels, said intermediate splitter member including a pair of spaced apart intermediate splitter facing panels each of said intermediate splitter facing panels including a center wall portion, a pair of end wall portions and a septum member disposed between said intermediate splitter center wall portions and extending longitudinally from one end of said intermediate splitter to the other end thereof thereby defining an intermediate splitter cavity between each intermediate splitter center wall portion and the intermediate splitter septum member, each of said intermediate splitter end wall portions and said intermediate splitter septum member being acoustically opaque and impervious to the fluid medium, each of said intermediate splitter center wall portions being perforated; and a plurality of spaced apart extreme splitter members disposed between and spaced apart from said third pair of duct facing panels each of said extreme splitter members including a pair of spaced apart extreme splitter facing panels, each of said extreme splitter facing panels including a center wall portion, a pair of end wall portions, and an extreme splitter septum member disposed between the center wall portions of each extreme splitter and extending longitudinally from one end of each extreme splitter to the respective other end thereof thereby defining an extreme splitter cavity between each extreme splitter center wall portion and extreme splitter septum member, each of said extreme splitter end wall portions and said extreme splitter septum members being acoustically opaque and impervious to the fluid medium, each of said extreme splitter center wall portions being perforated, the spaces between said first, second, and third pairs of duct facing panels defining progressively increasing numbers of fluid passageways, which break up the fluid medium and obstruct the fluid flow through the silencer.

19. The packless silencer of claim 18 which further comprises an acoustically opaque, fluid impervious divider member disposed transversely between the duct sidewalls and the center wall portions of said first pair of facing panels and between the center wall portions of said intermediate splitter member, and wherein each of said perforated center wall portions of said intermediate and extreme splitter members have an open area area in the range of from about 2 to 10%, said perforations each having an effective diameter in the range of from about 0.032 inch to 0.125 inch respectively for facing panels having a thickness of from about 26 gauge to 11 gauge.

20. A packless acoustic silencer for use in a duct member having a pair of opposed sidewall members for attenuating noise associated with a fluid medium passing through said silencer comprising:

a first section including a pair of opposed spaced apart generally triangular facing panels each of said facing panels including an inner wall portion disposed within the duct and adjacent to duct but spaced apart from one of the duct sidewalls and an end wall portion connecting its respective inner wall portion to its adjacent duct sidewall to define a cavity within each facing panel, each inner wall portion being perforated having an open area in the range of from about 2 to 10%, said perforations each having an effective diameter in the range of from about 0.032 inch to 0.125 inch respectively for facing panels having a thickness of from about 26 gauge to 11 gauge, each of the duct sidewalls and the facing panel end walls being acoustically opaque and impervious to the fluid, each of said facing panels further including an acoustically opaque, fluid impervious divider member extending transversely between the inner wall portion of each respective facing panel and its adjacent duct sidewall, intermediate the length of each facing panel, to divide each cavity into a plurality of chambers each of which having direct communication with the fluid but not with its adjacent chamber, said facing panels being disposed in complementary relation to one another such that the end wall portion of one facing panel is disposed at one end of the section and the end wall portion of the other facing panel is disposed at the opposite end of the section, the inner wall portions of the facing panels defining a diagonal fluid passageway extending from one end of the section to the opposite end of the section.

21. The packless silencer of claim 20 which further comprises a second section, substantially identical to the first section, said second section being combined with said first section in lateral juxtaposition with said first section along one of the duct sidewalls such that said first and second sections are in mirror image relation to one another and the fluid passageways of each section diverge from one end of the combined sections to the opposite end of the combined sections.

22. The packless silencer of claim 21 which further comprises a third and fourth section, each of said third and fourth sections being substantially identical to said first and second sections, said third section being combined with said fourth section in lateral juxtaposition with said fourth section along one of the duct sidewalls such that said third and fourth sections are disposed in mirror image relation with one another, one end of said combined third and fourth sections being in longitudinal juxtaposition with said combined first and second sections such that said third and fourth sections are disposed in mirror image relation with said first and second sections, respectively, and the fluid passageways of said third and fourth sections are contiguous with the fluid passageway of said first and second section, respectively and converge from one end of said combined third and fourth sections adjacent to said first and second section combination to the opposite end of said third and fourth section combination.

* * * * *